United States Patent
Liggins et al.

(10) Patent No.: US 8,651,263 B2
(45) Date of Patent: Feb. 18, 2014

(54) CONVEYOR SYSTEMS WITH CENTER GUIDE ASSEMBLIES

(75) Inventors: Joel Mark Liggins, Jackson, TN (US); Joe Ed Pinnix, Huntsville, AL (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 217 days.

(21) Appl. No.: 13/244,989

(22) Filed: Sep. 26, 2011

(65) Prior Publication Data

US 2013/0075232 A1   Mar. 28, 2013

(51) Int. Cl.
*B65G 47/26* (2006.01)

(52) U.S. Cl.
USPC ............ 198/442; 198/452; 198/457.05

(58) Field of Classification Search
USPC ............ 198/442, 449, 451, 452, 457.05, 599, 198/782, 785
See application file for complete search history.

(56) References Cited

U.S. PATENT DOCUMENTS

| | | | | |
|---|---|---|---|---|
| 3,355,008 A * | 11/1967 | Milazzo | | 198/751 |
| 4,499,991 A | 2/1985 | Allen | | |
| 4,813,529 A | 3/1989 | Kawai et al. | | |
| 4,960,203 A | 10/1990 | Kalazny | | |
| 5,190,142 A | 3/1993 | Stadler | | |
| 6,705,454 B2 | 3/2004 | Fishaw et al. | | |
| 8,025,028 B2 * | 9/2011 | Correa et al. | | 119/6.8 |
| 2009/0133989 A1 | 5/2009 | Takahashi et al. | | |

FOREIGN PATENT DOCUMENTS

JP   63165207   7/1988

* cited by examiner

*Primary Examiner* — Gene Crawford
*Assistant Examiner* — Lester Rushin
(74) *Attorney, Agent, or Firm* — Dinsmore & Shohl LLP

(57) ABSTRACT

A conveyor system includes a conveyor surface formed of a plurality of rollers in a single file arrangement. A center guide assembly has a guide configuration where a center guide member extends between adjacent ones of the plurality of rollers and beyond the conveyor surface and a recessed configuration where the center guide member is recessed from the conveyor surface.

17 Claims, 9 Drawing Sheets

US 8,651,263 B2

CONVEYOR SYSTEMS WITH CENTER GUIDE ASSEMBLIES

TECHNICAL FIELD

The present specification generally relates to conveyor systems and methods of conveying and guide assemblies therefor.

BACKGROUND

Articles are frequently transported using conveyor systems. For relatively heavy articles, such as a cylinder block for a vehicle, a guide rail may be used to maintain alignment of the cylinder block as the cylinder block travels along the conveyor system. The guide rail may be bolted to a frame member of the conveyor to prevent movement of the guide rail and to maintain the position of the guide rail as the cylinder block travels along the length of the guide rail.

SUMMARY

In one embodiment, a conveyor system includes a conveyor surface formed of a plurality of rollers in a single file arrangement. A center guide assembly has a guide configuration where a center guide member extends between adjacent ones of the plurality of rollers and beyond the conveyor surface and a recessed configuration where the center guide member is recessed from the conveyor surface.

In another embodiment, a conveyor system includes a conveyor surface formed of a plurality of rollers. A center guide assembly includes multiple center guide members, each guide member being located between adjacent ones of the plurality of rollers. The center guide assembly has a guide configuration where the multiple center guide members extend between the adjacent ones of the plurality of rollers and beyond the conveyor surface. The center guide assembly has a recessed configuration where the multiple center guide members are recessed from the conveyor surface.

In another embodiment, a method of conveying an article comprises: providing a conveying surface comprising a plurality of rollers; providing a center guide assembly comprising multiple center guide members, each guide member being located between adjacent ones of the plurality of rollers; placing the center guide assembly in a guide configuration where the multiple center guide members extend between the adjacent ones of the plurality of rollers and beyond the conveyor surface; and placing the center guide assembly in a recessed configuration where the multiple center guide members are recessed from the conveyor surface.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to conveyor systems that include positionable guide systems that can be moved into and out of a conveyor path provided by the conveyor systems. In particular, the guide systems may include a center guide assembly that, in a guide configuration, is located in the conveyor path to guide an article as the article is conveyed along the conveyor path. The center guide assembly may also include a recessed configuration where the center guide assembly is removed from the conveyor path such that the center guide is no longer used to guide the article. Such a recessed configuration can facilitate removal of the article from the conveyor path, for example, in a direction transverse to the conveying direction by an operator manually and/or by an automated system such as an actuator or robot.

Conveyor systems described herein may be used to convey any number of articles. The conveyor systems may be particularly suitable for relatively heavy articles, such as cylinder blocks for vehicle engines. The cylinder blocks may be cast as a metal block with ports and channels defined therein, such as cylinder chambers, oil and air ducts, and a crank shaft cavity. Such cylinder blocks may be conveyed on conveyor systems having no outer guide rails so that side surfaces of the cylinder block do not slide along such outer guide rails for at least a portion of the conveyor path. In some embodiments, the conveyor systems may include outer guide rails, which may be used in conjunction with the center guide assemblies described herein. As used herein, the term "center guide" refers to a guide that may be located in the conveyor path. In some embodiments, an article, such as a cylinder block may be conveyed along opposite sides of the center guide assembly while being guided by the center guide assembly. Various embodiments and configurations of the center guide assemblies will be described in greater detail below.

Figure 1:
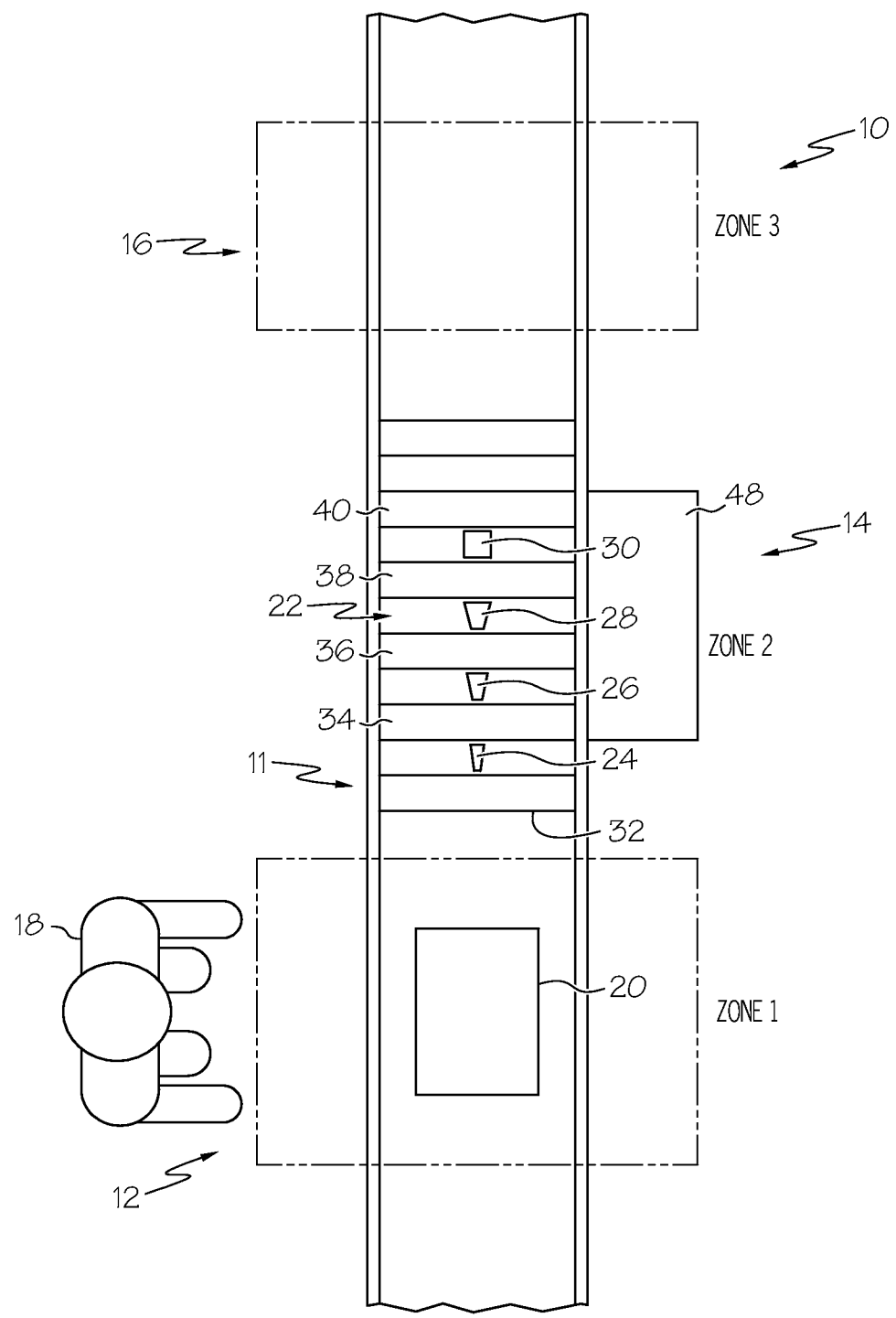
FIG. 1 is a diagrammatic view of a conveyor system according to one or more embodiments described herein.

Referring to FIG. 1, a conveyor system 10 generally includes a conveyor 11 including an inspection station 12 (Zone 1), a removal station 14 (Zone 2) and a continuing assembly section 16 (Zone 3). At Zone 1, an operator 18 may inspect a cylinder block 20 to determine whether or not the cylinder block 20 meets predetermined requirements, such as size, shape and other manufacturing parameters. In some embodiments, the operator 18 may use sensors or other devices at Zone 1 for determining cylinder block compliance with the predetermined parameters.

After inspection, the cylinder block 20 may move to Zone 2. The cylinder block 20 may be guided through Zone 2 using the center guide assembly 22. The center guide assembly 22 may include one or more center guide members 24, 26, 28 and 30 that are each located between adjacent conveyor rollers 32 and 34, 34 and 36, 36 and 38, 38 and 40 (e.g., low torque motorized rollers) arranged in a single file fashion. While the conveyor rollers 32, 34, 36, 38 and 40 are illustrated in a substantially straight line, they may form a bend or curve. The center guide members 24, 26, 28 and 30 may each be received within the crank shaft cavity 48 (FIG. 3) of the cylinder block 20. As will be described in detail below, the center guide assembly 22 has a guide configuration where the center guide members 24, 26, 28 and 30 are in a raised position so that they are located in the conveyor path of the cylinder block 20. Such a guide configuration allows the center guide members 24, 26, 28 and 30 to guide the cylinder block 20 as the cylinder block 20 moves within Zone 2 from Zone 1 and, in many instances, into Zone 3. The center guide assembly 22 also includes a recessed configuration where the center guide members 24, 26, 28 and 30 are in a lowered position so that they are removed or recessed out of the conveyor path of the cylinder block 20. Such a recessed configuration allows the operator 18 to push or otherwise move the cylinder block 20 in a horizontal direction, transverse to the conveyor path to a removal station 48 (e.g., due to a failed inspection) without the center guide members 24, 26, 28 and 30 interfering with the transverse movement of the cylinder block 20.

Figure 2:
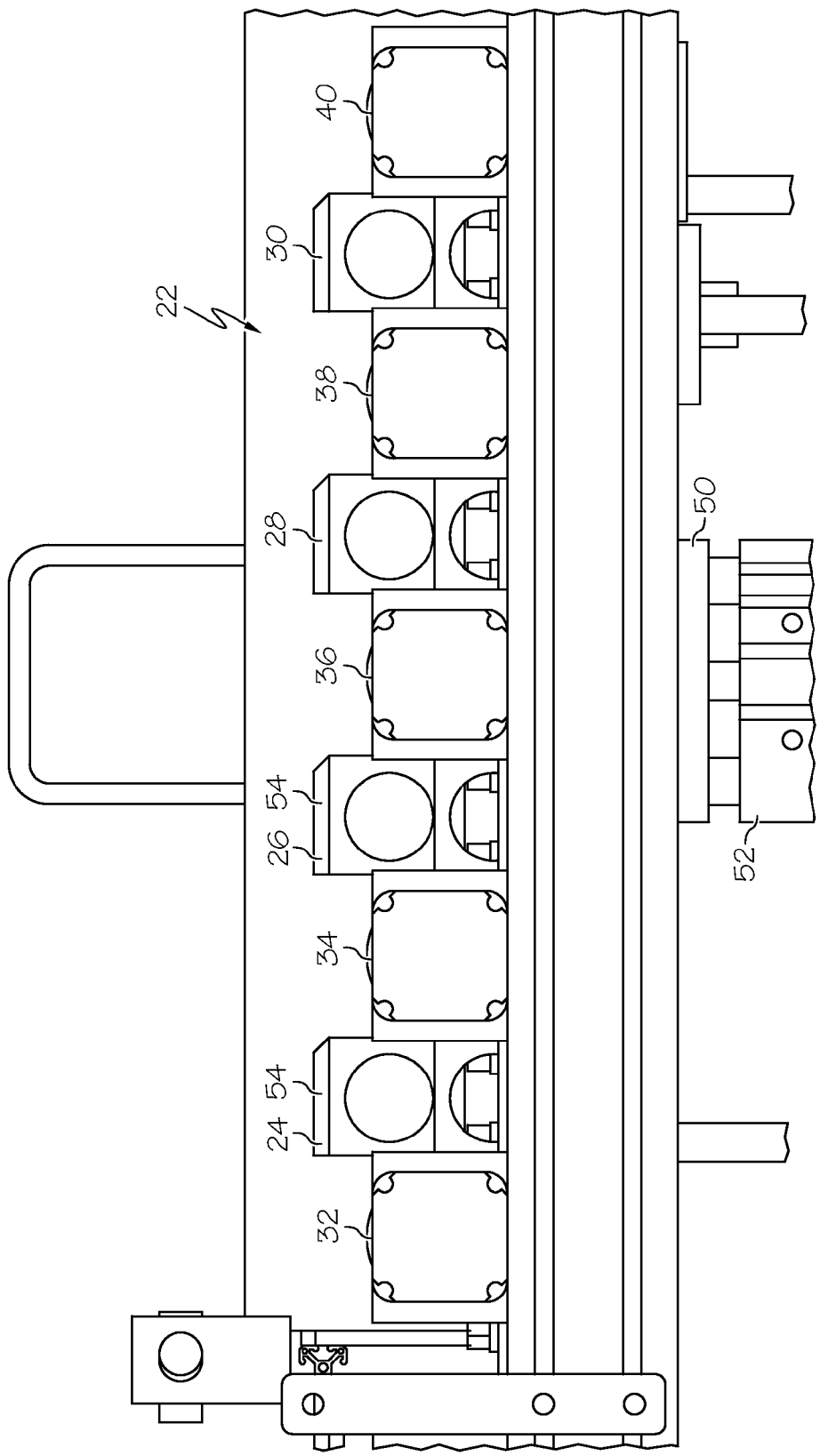
FIG. 2 is a side view of the conveyor system of FIG. 1 in a guide configuration according to one or more embodiments described herein.
Figure 3:
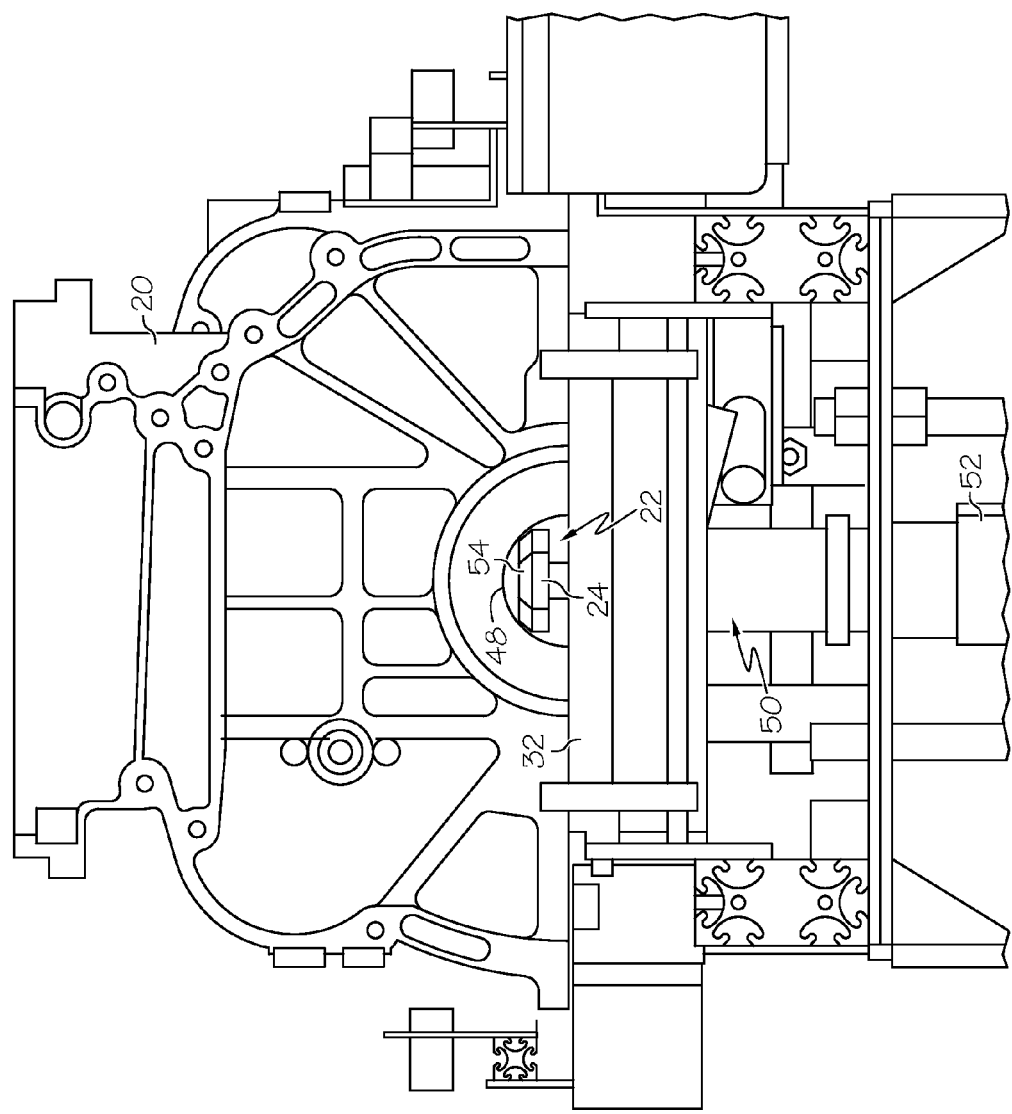
FIG. 3 is an end view of the conveyor system of FIG. 1 according to one or more embodiments described herein.

Referring to FIGS. 2 and 3, Zone 2 is illustrated in isolation and includes the center guide assembly 22 with the center guide members 24, 26, 28 and 30. In the illustrated exemplary embodiment, each center guide member 24, 26, 28 and 30 is mounted upon a horizontal support member 50. The center guide members 24, 26, 28 and 30 extend upwardly from the support member 50 and are each spaced-apart from each other in the conveying direction a distance to allow conveyor rollers 34, 36 and 38 to fit therebetween. The support member 50 is, in turn, connected to an actuator 52 (e.g., a pneumatic or hydraulic cylinder) that raises and lowers the support member 50 and the center guide members 24, 26, 28 and 30 fixedly mounted thereto. As can be seen by FIG. 2, the center guide members 24, 26, 28 and 30 each have a height that allows a top surface 54 of each center guide member 24, 26, 28 and 30 to extend upwardly beyond a top conveying surface that is formed by the conveyor rollers 32, 34, 36, 38, 40. In other words, the center guide members 24, 26, 28 and 30, in the guide configuration, extend into the conveyor path of the cylinder block 20. As used herein, the term "conveyor path", in the context of a cylinder block, refers to the volume occupied by the cylinder block 20 at the cylinder block travels along the conveying surface and includes the crank shaft cavity 48 (FIG. 3).

Figure 4:
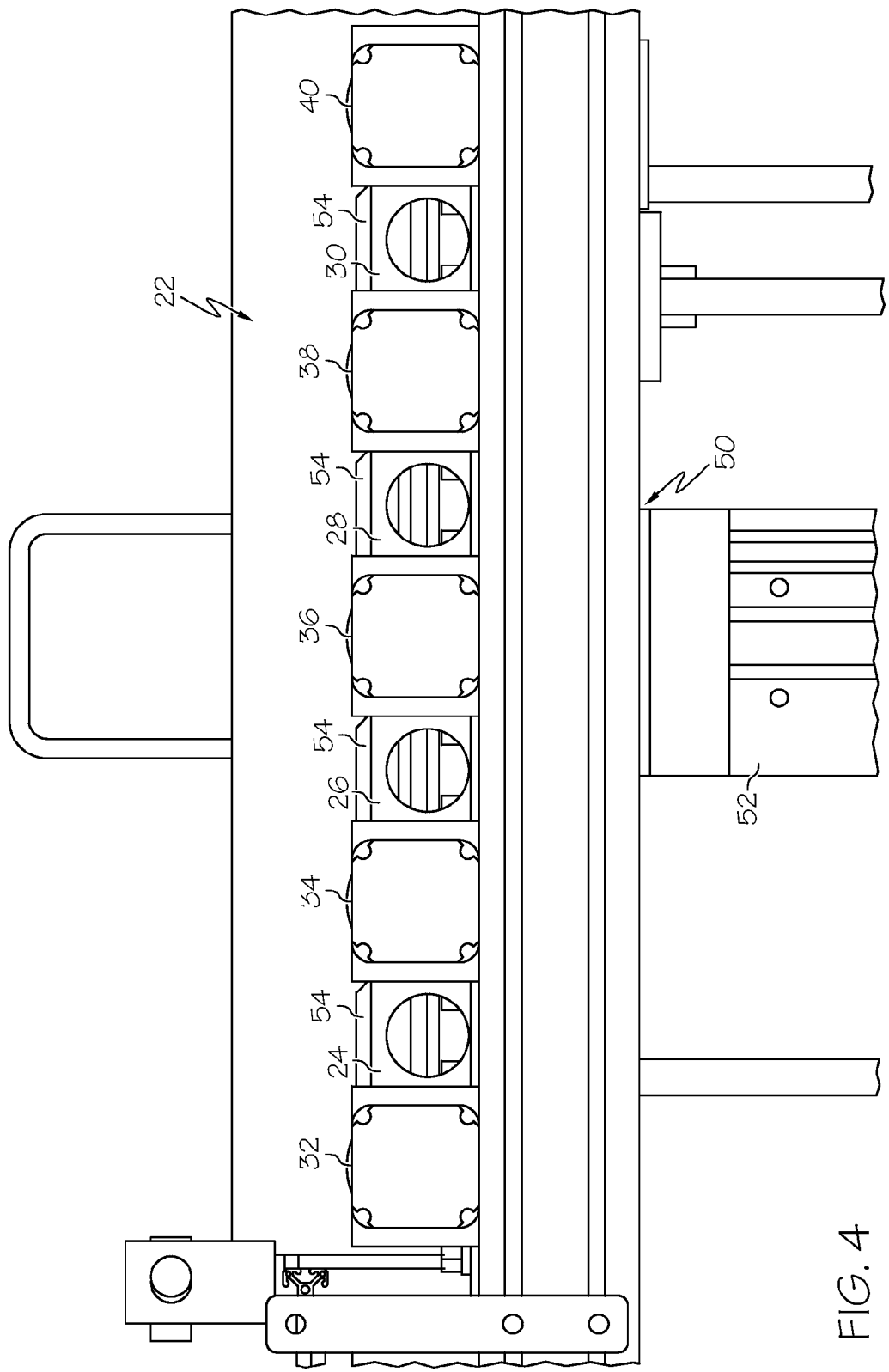
FIG. 4 is a side view of the conveyor system of FIG. 1 in a recessed configuration according to one or more embodiments described herein.

FIGS. 2 and 3 illustrate the center guide assembly 22 in the guide configuration with the center guide members 24, 26, 28 and 30 in the conveyor path. Referring to FIG. 4, the center guide assembly 22 is illustrated in the recessed configuration with the center guide members 24, 26, 28 and 30 lowered out of the conveyor path and below the conveying surface formed by the conveyor rollers 32, 34, 36, 38 and 40. In this configuration, the actuator 52 lowers the support member 50 and the center guide members 24, 26, 28 and 30 fixedly mounted thereto. The top surfaces 54 are located below the conveying surface formed by the conveyor rollers 32, 34, 36, 38 and 40.

Figure 5:
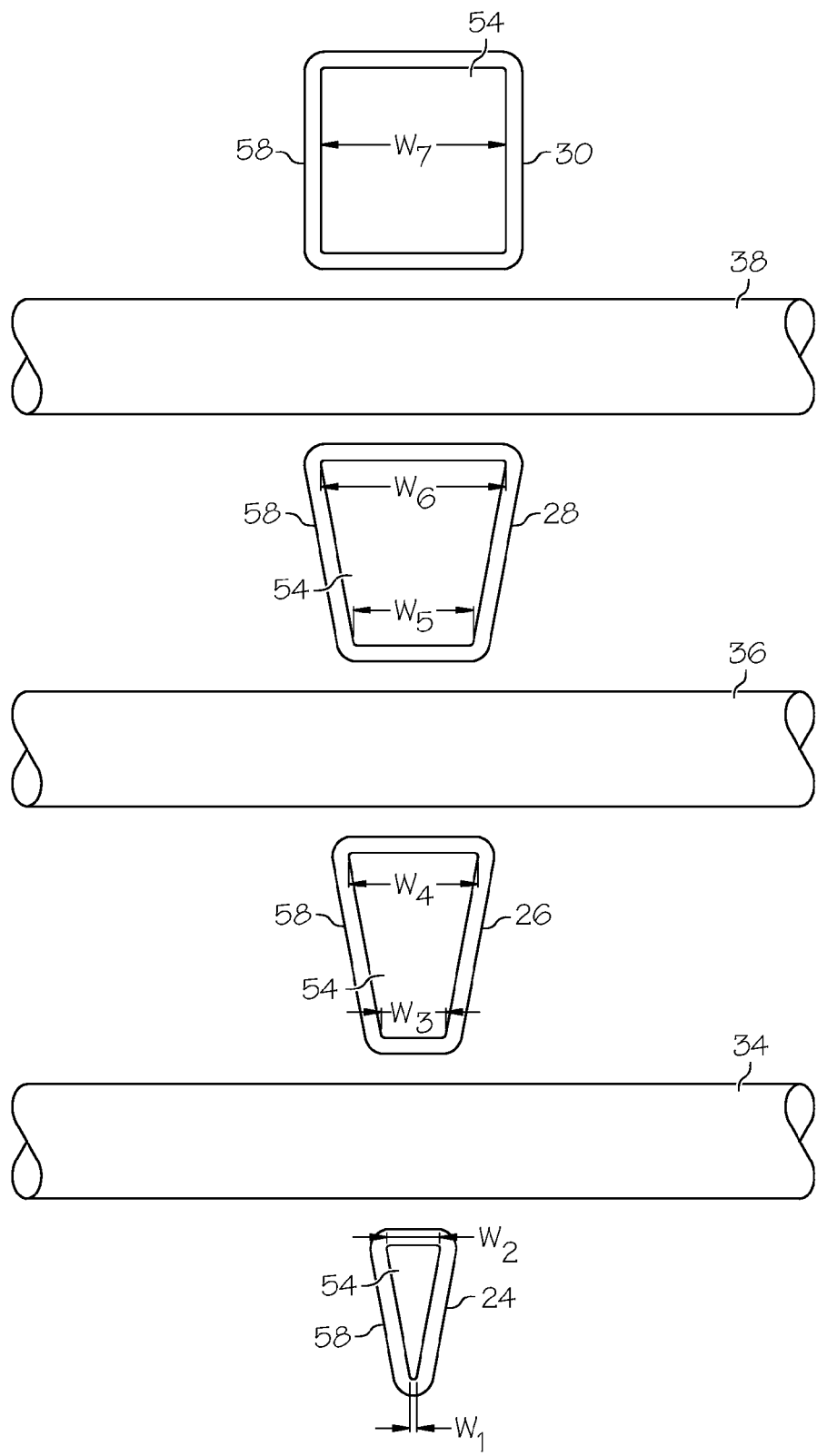
FIG. 5 is a top view of center guide members for use with the conveyor system of FIG. 1 according to one or more embodiments described herein.

Referring to FIG. 5, the center guide members 24, 26, 28 and 30 are illustrated with each center guide member 24, 26, 28 and 30 located between an adjacent conveyor roller 32 and 34, 34 and 36, 36 and 38, 38 and 40. In some embodiments, at least a portion of one or more of the center guide members 24, 26, 28 and 30 has a taper contour to facilitate alignment of the cylinder block 20 as the cylinder block 20 engages the center guide assembly 22. For example, the center guide member 24 may have a width $W_1$ at the trailing edge of the top surface 54 that is less than a width $W_2$ than a width at the leading edge of the top surface 54. Similarly, the center guide 26 may have a width $W_3$ at the trailing edge of the top surface 54 that is less than a width $W_4$ than a width at the leading edge of the top surface 54. Likewise, the center guide 28 may have a width $W_5$ at the trailing edge of the top surface 54 that is less than a width $W_6$ than a width at the leading edge of the top surface 54. In some embodiments, $W_1$ may be less than $W_3$, which may be less than $W_5$. Additionally, $W_2$ may be less than $W_4$, which may be less than $W_6$. Such an increasing width from center guide member to center guide member and along an individual center guide member in the conveying direction can allow the cylinder block 20 to align itself as the cylinder block 20 travels. Center guide member 30 may have about the same width $W_7$ along its length. In some embodiments, $W_7$ may be greater than any of the widths $W_1$ through $W_6$. In some embodiments, the center guide members 24, 26, 28 and 30 may have a chamfered or otherwise angled (e.g., 45 degrees to vertical) surfaces from the top surfaces 54 to each side surface 58, which can further facilitate alignment of the cylinder block 20.

Figure 6:
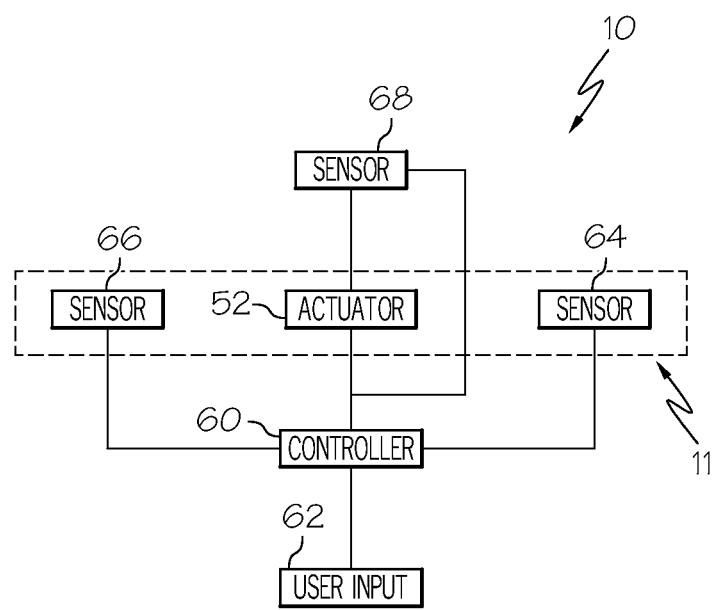
FIG. 6 is a schematic illustration of the conveyor system of FIG. 1 according to one or more embodiments described herein.

FIG. 6 illustrates the conveyor system 10 schematically. A controller 60 may be used to control actuation of the actuator 52 and the conveyor 11, for example, based on a user input device 62 and/or signals from sensors 64 and 66. In some embodiments, the sensors 64 and 66 are proximity sensors that detect presence (or absence) of the cylinder block 20. In some embodiments, another sensor 68 may detect position of the actuator 52 (and/or the center guide assembly 22) to determine what configuration the center guide assembly 22 is in. In another embodiment, the controller 60 may include logic that tracks whether the center guide assembly 22 is in the guide configuration or the recessed configuration.

Figure 7:
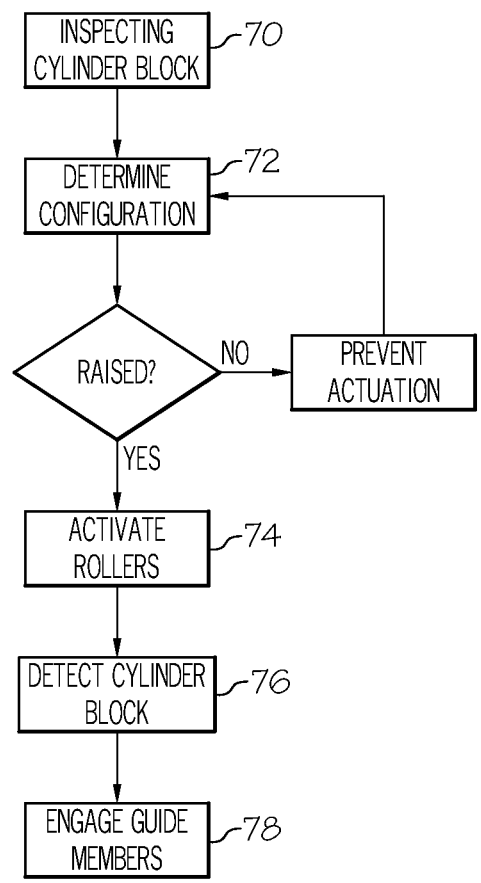
FIG. 7 illustrates a method of conveying an article using the conveyor system of FIG. 1 according to one or more embodiments described herein.

Referring to FIG. 7, operation of the conveyor system 10 includes inspecting the cylinder block 20 at step 70. Once the inspection is complete, the controller may poll sensor 68 thereby determining the configuration of the center guide assembly 22 at step 72. If the center guide assembly 22 is in the raised, guide configuration, the conveyor rollers 32, 34, 36, 38 and 40 may be activated at step 74. The controller 60 may then detect the presence of the cylinder block 20 using the sensor 64 at step 76. At step 78, the cylinder block 20 engages the center guide members 24, 26, 28 and 30, one after another, as the cylinder block 20 is conveyed through Zone 2. If the controller 60 determines at step 72 that the center guide assembly 22 is in the lowered, recessed configuration, the controller 60 may prevent activation of the conveyor rollers 32, 34, 36, 38 and 40. This prevents movement of the cylinder block 20 into and through Zone 2.

Figure 8:
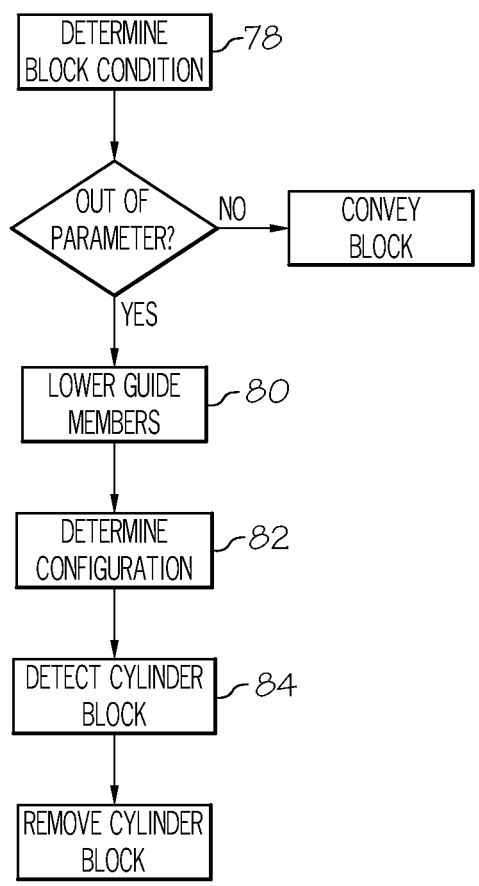
FIG. 8 illustrates a method of conveying an article using the conveyor system of FIG. 1 according to one or more embodiments described herein.
Figure 9:
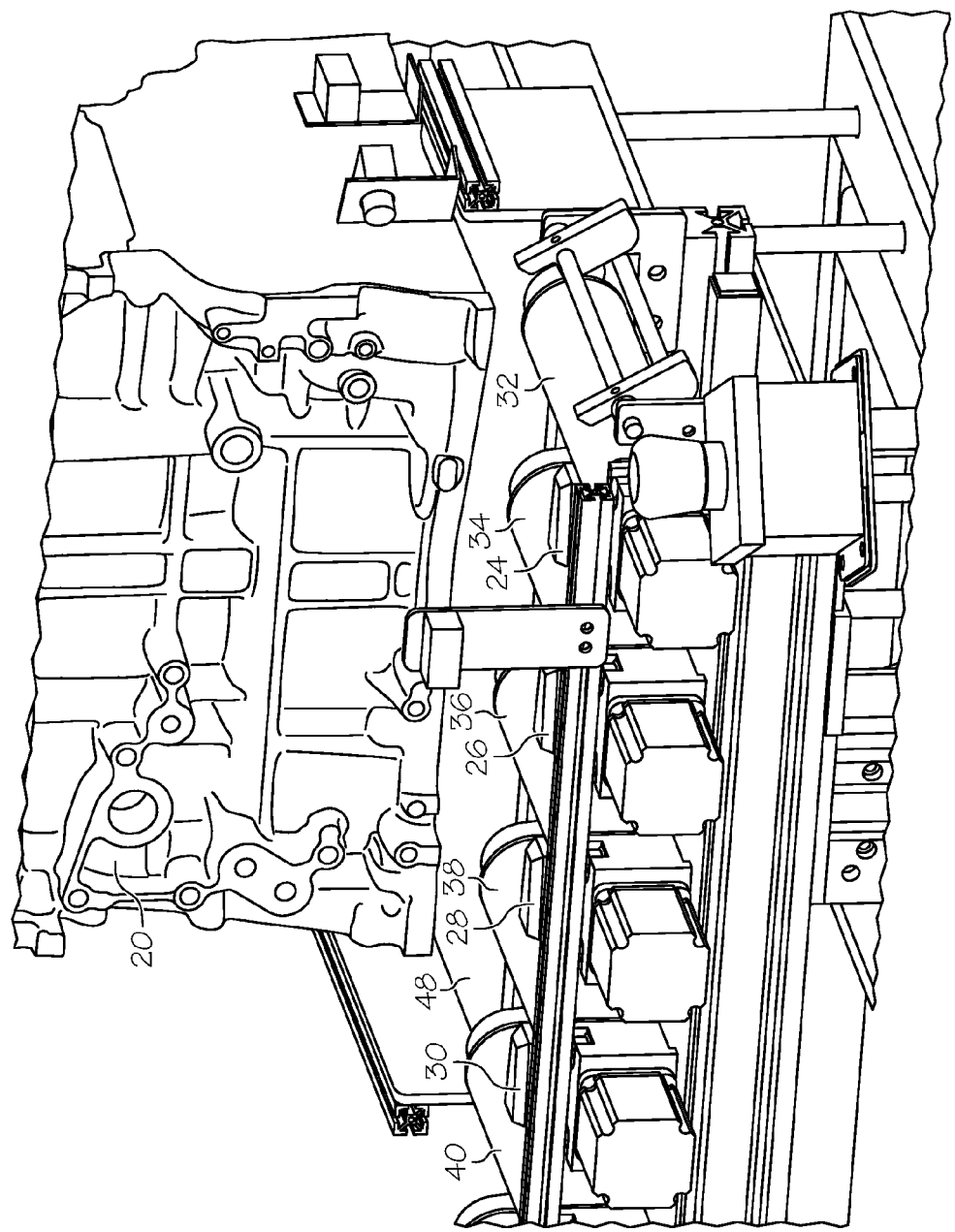
FIG. 9 illustrates a perspective view of the conveyor system of FIG. 1 according to one or more embodiments described herein.

Referring to FIG. 8, once the cylinder block 20 is located in Zone 2 (e.g., between sensors 64 and 66), the operator may determine whether to allow the cylinder block to move through Zone 2 at step 78. If the inspection determines an out of parameter condition for the cylinder block 20, the controller 60 and/or the operator using user input device 62 may actuate the actuator 52 and lower the center guide assembly 22 into its recessed configuration at step 80. At step 82, the controller 60 may detect the center guide assembly 22 in the recessed configuration and stop rotation of the conveyor rollers 32, 34, 36, 38 and 40. At step 84, the controller 60 may also poll the sensors 64 and 66 to determine that the cylinder block 20 is squarely within Zone 2. Once the center guide assembly 22 is in the lowered, recessed configuration, the operator may push the cylinder block 20 off of the conveyor in a direction transverse to the conveying direction. FIG. 9 illustrates the cylinder block 20 being removed from the conveyor. As can also be seen by FIG. 9, the conveyor rollers 32, 34, 36, 38 and, 40 extend continuously over the entire width of the conveyor path, thereby providing a continuous surface along which the cylinder block 20 may be removed from the conveyor.

The center guide members 24, 26, 28 and 30 may be formed of any suitable material and using any suitable process. As one example, the center guide members 24, 26, 28 and 30 may be formed of mild, chrome-plated steel and may be formed by casting, machining, etc. While four center guide members 24, 26, 28 and 30 are illustrated, more or less than four center guide members 24, 26, 28 and 30 may be used.

The above-described conveyor systems 10 can be used to transport relatively heavy articles, such as cylinder blocks, using a center guide assembly 22 that can be raised into and lowered out of the conveyor path without use of any tools. The center guide assembly 22 includes center guide members 24, 26, 28 and 30 that are each located between adjacent conveyor rollers with the conveyor rollers located on upstream and downstream sides of the center guide members 24, 26, 28 and 30. Additionally, the conveyor rollers extend across the entire conveyor path in a single file alignment. Such a continuous roller arrangement can provide a continuous support surface that facilitates removal of the cylinder blocks from the conveyor path.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A conveyor system, comprising:
   a conveyor surface formed of a plurality of rollers in a single file arrangement; and
   a center guide assembly having a guide configuration where a center guide member extends between adjacent ones of the plurality of rollers and beyond the conveyor surface and a recessed configuration where the center guide member is recessed from the conveyor surface;
   wherein the center guide assembly comprises a plurality of center guide members, the plurality of center guide members located between adjacent ones of the plurality of rollers;
   wherein a first guide center guide member of the plurality of center guide members has a first width at a trailing edge of a top surface of the first guide member and a second width at a leading edge of the top surface of the first guide member, wherein the first width is different from the second width.

2. The conveyor system of claim 1 further comprising an actuator that locates the center guide assembly in the guide configuration and the recessed configuration.

3. The conveyor system of claim 1, wherein a second guide center guide member of the plurality of center guide members has a third width at a trailing edge of a top surface of the first guide member and a fourth width at a leading edge of the top surface of the first guide member, wherein the third width is different from the fourth width.

4. The conveyor system of claim 3, wherein the second width is different from the fourth width.

5. The conveyor system of claim 3, wherein the first width is different from the third width.

6. The conveyor of claim 1 further comprising a sensor that detects position of the center guide assembly.

7. A conveyor system, comprising:
   a conveyor surface formed of a plurality of rollers; and
   a center guide assembly comprising multiple center guide members, each guide member being located between adjacent ones of the plurality of rollers;
   wherein the center guide assembly has a guide configuration where the multiple center guide members extend between the adjacent ones of the plurality of rollers and beyond the conveyor surface;
   wherein the center guide assembly has a recessed configuration where the multiple center guide members are recessed from the conveyor surface;
   wherein a first guide center guide member of the multiple center guide members has a first width at a trailing edge of a top surface of the first guide member and a second width at a leading edge of the top surface of the first guide member, wherein the first width is different from the second width.

8. The conveyor system of claim 7, wherein the center guide assembly comprises a support member, the multiple center guide members being mounted to the support member.

9. The conveyor system of claim 8 further comprising an actuator connected to the support member to locate the center guide assembly in the guide configuration and the recessed configuration.

10. The conveyor system of claim 7, wherein a second guide center guide member of the multiple center guide members has a third width at a trailing edge of a top surface of the first guide member and a fourth width at a leading edge of the top surface of the first guide member, wherein the third width is different from the fourth width.

11. The conveyor system of claim 10, wherein the second width is different from the fourth width.

12. The conveyor system of claim 10, wherein the first width is different from the third width.

13. The conveyor system of claim 7 further comprising a sensor that detects position of the center guide assembly.

14. A method of conveying an article, the method comprising:
   providing a conveying surface comprising a plurality of rollers;
   providing a center guide assembly comprising multiple center guide members, each center guide member being located between adjacent ones of the plurality of rollers, wherein a first guide center guide member of the multiple center guide members has a first width at a trailing edge of a top surface of the first guide member and a second width at a leading edge of the top surface of the first guide member, wherein the first width is different from the second width;
   placing the center guide assembly in a guide configuration where the multiple center guide members extend between the adjacent ones of the plurality of rollers and beyond the conveyor surface; and
   placing the center guide assembly in a recessed configuration where the multiple center guide members are recessed from the conveyor surface.

15. The method of claim 14 further comprising detecting location of the center guide assembly using a sensor.

16. The method of claim 14 further comprising preventing actuation of the plurality of rollers with the center guide assembly in the recessed configuration using a controller.

17. The method of claim 14 further comprising removing the article from the conveying surface with the center guide assembly in the recessed configuration by forcing the article off of the conveying surface.

\* \* \* \* \*